H. CASLER.
DRILL CHUCK.
APPLICATION FILED SEPT. 3, 1919.

1,391,299. Patented Sept. 20, 1921.

INVENTOR
H Casler
BY Howard P. Denison
ATTORNEY

UNITED STATES PATENT OFFICE.

HERMAN CASLER, OF CANASTOTA, NEW YORK.

DRILL-CHUCK.

1,391,299.  Specification of Letters Patent.  Patented Sept. 20, 1921.

Application filed September 3, 1919. Serial No. 321,394.

*To all whom it may concern:*

Be it known that I, HERMAN CASLER, of Canastota, in the county of Madison, in the State of New York, have invented new and useful Improvements in Drill-Chucks, of which the following, taken in connection with the accompanying drawings, is a full, clear, and exact description.

This invention relates to certain improvements in drill chucks involving the use of a suitable head having radial ways for receiving a pair of opposed radially movable jaws, which are adapted to be operated by means of tangent screws for gripping and releasing a drill or other boring tool.

In work of this character, it is frequently necessary or expedient to first drill a hole and then to enlarge or finish it to a predetermined size, and the main object of my present invention is to provide simple and efficient means whereby the same screws may be used for adjusting the jaws simultaneously in opposite directions for gripping and releasing the tool and also for adjusting the jaws simultaneously in one and the same direction for decentering the drill different distances from the axis of the chuck, whereby the bore may be gradually enlarged to any extent within the range of adjustment of the jaws.

Another object is to provide means whereby the degree of offset of the tool from the axis of the chuck may be accurately determined. Other objects and uses relating to the specific parts will be brought out in the following description.

Figure 1:
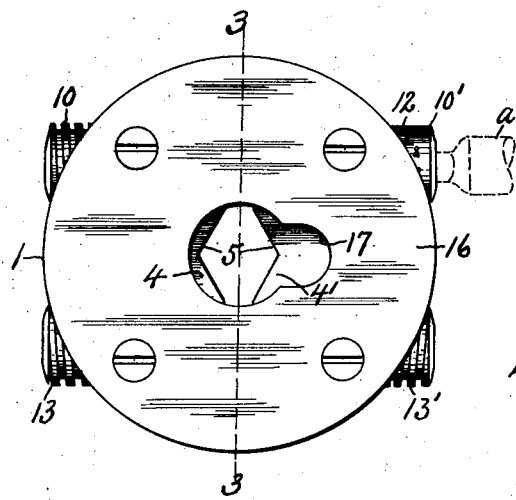
Figure 2:
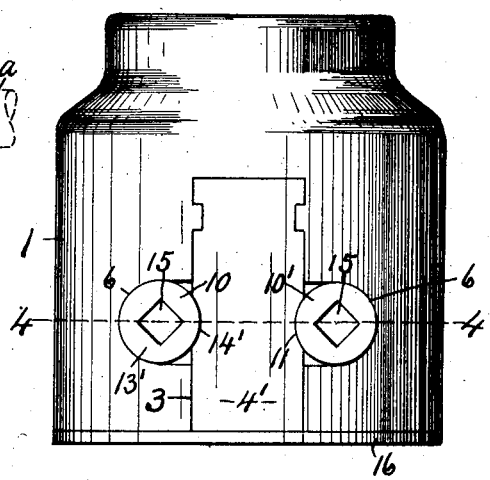

In the drawings, Figures 1 and 2 are, respectively, an end view and a side elevation of a chuck embodying the features of my invention.

Figure 3:
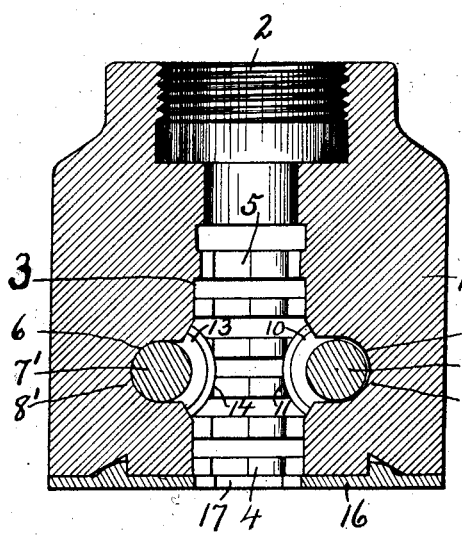
Figure 4:
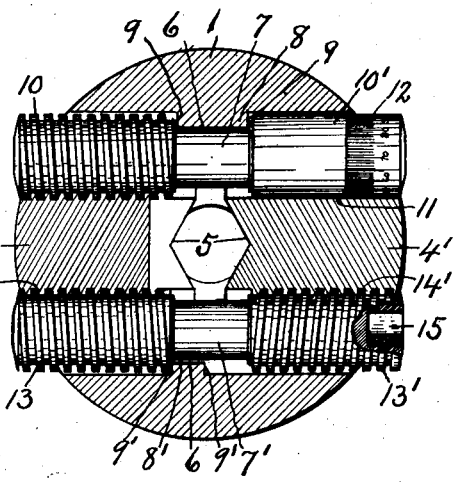

Figs. 3 and 4 are sectional views taken on line 3—3 Fig. 1, and line 4—4 Fig. 2, respectively.

As illustrated, this chuck comprises a cylindrical head —1— having one end provided with a central threaded socket —2— for attachment to a rotary shaft or spindle, not shown, the opposite end of the head being provided with a transverse slot —3— extending diametrically therethrough from side to side and through the outer end thereof for the reception of a pair of opposed jaws —4— and —4'— having V-shaped inner edges —5— for gripping a drill or boring tool.

The opposite walls of the slot or guideway —3— are provided with parallel cylindrical openings —6— disposed in the same transverse plane at right angles to the axis of the chuck, and between the ends thereof, at equal distances from said axis for receiving a pair of rotary spindles —7— and —7'—.

The openings —6— extend from side to side of the head —1— and communicate at their inner sides with the guideway —3— with sufficient clearance to allow the spindles to be removed when the jaws are disengaged therefrom as will be hereinafter more fully explained.

The portions of the cylindrical openings —6— between the ends thereof, are reduced in diameter to form ribs —8— and —8'— and shoulders —9— and —9'— at the ends of the ribs, the length of the rib —8'— being considerably less than that of the rib —8—, so that the shoulders —9'— are separated a considerably less distance than that of the shoulders —9— to permit axial movement of the corresponding spindle —7'—.

The central portions of the spindles —7— and —7'— which register with the ribs —8— and —8'— are reduced in diameter, the length of the reduced portions being substantially equal to the corresponding length of the rib —8— or distance between the shoulders —9—, so that both ends of said spindles are enlarged to form stops at their inner ends for engaging the adjacent shoulders of the corresponding ribs —8— and —8'—.

The distance between the enlarged ends of the spindle —7— is substantially equal to the distance between the shoulders —9— against which they abut, thereby holding that spindle against axial movement, while permitting its rotary adjustment.

On the other hand the distance between the enlarged ends of the spindle —7'— is considerably greater than that between the shoulders —9'— which permits a limited axial movement of said spindle for decentering purposes presently described and also for gripping the tool.

One of the enlarged ends as —10— is threaded to form a screw (in this instance right hand), which engages corresponding threads in the adjacent face of the jaw —4—.

The opposite enlarged end as —10'— of the same spindle is cylindrical and preferably smooth or unthreaded, and is adapted to ride in a smooth cylindrical recess —11— in the adjacent face of the jaw —4—, the periphery of said enlarged portion —10'— being graduated at —12— to register with a fixed index on the periphery of the head —1— for determining the degree of offset or decentering of the jaws —4— and —4'— as produced by the rotation of the spindle —7— through the medium of its screw —10— acting directly upon the jaw —4—, which through the medium of the spindle —7'— transmits motion to the jaw —4'— in a manner hereinafter more fully explained.

Both of the enlarged ends of the spindle —7'— are threaded at —13— and —13'— respectively, and are engaged with corresponding threads —14— and —14'— on the adjacent faces of the jaws —4— and —4'—.

The threads —13— and —13'— of the spindle —7'— are preferably of opposite pitch, or right and left hand respectively, so that when the spindle —7'— is rotated in reverse directions, the engagement of its screw —13— with the jaw —4— will cause it to move axially, while the engagement of the screw —13'— will move the jaw —4'— in the same direction, because under those conditions the jaw —4— will be held against movement by its engagement with the then stationary screw —10— of the other spindle which will hold the jaw —4— against endwise movement.

The spindles —7— and —7'— are provided in one and the same end with angular sockets —15— for receiving a corresponding wrench —a— by which either spindle may be rotated independently of the other.

The portions of the head —1— at opposed sides of the slot or guideway —3— are held against springing apart by a cap plate —16— similar to that set forth in my application Serial No. 285,964, filed March 29, 1919, except that its central opening is elongated at —17— in one direction lengthwise of the jaws to permit the tool to be decentered while held by the jaws.

The opening for receiving the tool is substantially equal to the width of the slot or guideway for the jaws, except as to the elongation —17— for the purpose mentioned, and may therefore receive the shank of a tool of equal or less diameter.

It is now evident that by rotating the spindle —7'— it may be adjusted endwise a distance corresponding to the difference between the width of the rib —8'— and the distance between the inner ends of the screws —13— and —13'— and that a tool inserted between the jaws may be firmly clamped between them by the rotation of the spindle —7'— in the proper direction or to the right, which will move the jaw —4'— toward the jaw —4—.

Then if it is found that the tool is off center relatively to the head —1— it is simply necessary to rotate the spindle —7— in the proper direction or to the right, which will shift both jaws together with the spindle —7'— until the drill is properly centered.

On the other hand, if it is desired to decenter the drill, it may be readily accomplished by rotating the spindle —7— in a reverse direction, the degree of offset being indicated by graduations —12— on the cylindrical enlargement —10'—.

If it should be desired to loosen the jaws entirely from the head, the spindle —7'— may be rotated to the left until the threaded enlargement —13— engages its companion shoulder —9'— which will spread the jaws —4— and —4'— a certain amount, whereupon rotation of the spindle —7— to the left will shift the other spindle —7'— until limited by the engagement of the threaded enlargement —13'— with its corresponding shoulder —9'— after which the spindle —7'— may be again rotated to the left to further spread the jaws —4— and —4'— until the movement of said spindle is again limited by the engagement of the threaded part —13— with its shoulder —9'—.

By repeating these operations of the spindles, the jaws may be freed from their engagement with the threaded portions of both spindles at which time they may be withdrawn by hand, it being understood that they may be replaced by reverse operations of the spindles.

What I claim is:—

1. In a chuck of the character described, the combination of a pair of jaws, a rotary threaded spindle for moving one jaw toward and from the other jaw, means for holding said spindle against endwise movement, an axially movable rotary spindle having threaded engagement with both jaws, and means for limiting the axial movement of the last named spindle.

2. In a chuck of the character described, the combination of a pair of threaded jaws, a rotary spindle having threaded portions engaged with the threads of both jaws and movable axially, and a separate spindle having threaded engagement with one of the jaws only, the other jaw being slidable relatively to the last named spindle.

In witness whereof I have hereunto set my hand this 26th day of August, 1919.

HERMAN CASLER.

Witnesses:
 HARRY HULL,
 ADAM WISE.